United States Patent
Schwarz

(10) Patent No.: US 6,635,192 B1
(45) Date of Patent: Oct. 21, 2003

(54) ELECTRICALLY CONDUCTIVE MICROCAPILLARY COMPOSITE MATRIX AND METHOD FOR PRODUCING SAME

(76) Inventor: Wolfgang Schwarz, Josefstädterstrasse 65/6, A-1080 Vienna (AT)

( * ) Notice: Subject to any disclaimer, the term of this patent is extended or adjusted under 35 U.S.C. 154(b) by 0 days.

(21) Appl. No.: 09/623,613

(22) PCT Filed: Mar. 8, 1999

(86) PCT No.: PCT/AT99/00056

§ 371 (c)(1),
(2), (4) Date: Sep. 5, 2000

(87) PCT Pub. No.: WO99/46218

PCT Pub. Date: Sep. 16, 1999

(30) Foreign Application Priority Data

Mar. 9, 1998 (AT) ............................................. 403/98

(51) Int. Cl.⁷ ........................... H01B 1/04; C04B 12/00; C04B 14/38; B05D 5/12
(52) U.S. Cl. ........................ 252/502; 252/508; 252/512; 252/514; 106/601; 106/691; 427/126.4
(58) Field of Search ................................. 252/502, 508, 252/511, 512, 514; 106/601, 629, 691, 472; 427/126.4

(56) References Cited

U.S. PATENT DOCUMENTS

| | | | |
|---|---|---|---|
| 3,445,257 A | 5/1969 | Hloch et al. ................... | 106/84 |
| 4,632,777 A | 12/1986 | Nicholson | |
| 5,372,640 A | 12/1994 | Schwarz et al. | |
| 6,372,694 B1 * | 4/2002 | Osinga et al. ............... | 507/140 |

FOREIGN PATENT DOCUMENTS

| | | | |
|---|---|---|---|
| AT | 325180 | | 10/1975 |
| CH | 572966 | | 2/1976 |
| DE | 3006551 | | 4/1980 |
| DE | 4134783 | | 4/1993 |
| EP | 0133953 | | 3/1985 |
| EP | 0210058 | | 1/1987 |
| EP | 0230303 | | 7/1987 |
| EP | 0443229 | | 8/1991 |
| EP | 499437 | * | 8/1992 |
| EP | 0554757 | | 8/1993 |
| EP | 581433 | * | 2/1994 |
| GB | 2140456 | | 11/1984 |
| GB | 2247458 A | | 3/1992 |
| JP | 62-267485 | | 11/1987 |
| JP | 05070977 | | 3/1993 |

* cited by examiner

*Primary Examiner*—Mark Kopec
(74) *Attorney, Agent, or Firm*—Ostrolenk, Faber, Gerb & Soffen, LLP

(57) ABSTRACT

An electronically conducting microcapillary composite matrix, produced by applying a painting or coating material on mortar or concrete, is disclosed. The painting or coating material comprises at least one of the following compounds: alumino-silicate of the summation formula $aM_2O*bAl_2O_3*cSiO_2$, with a ratio of c/b ranging from 1 to 40, preferably ranging from 5 to 20, and a ratio of a/b ranging from 1 to 25, preferably ranging from 5 to 15, with M=Li, Na, K; alumino-hydroxo-complex of the summation formula $M_xAl(OH)_y$, with x ranging from 1 to 3 and y ranging from 4 to 6, with M=Na, K; aluminum phosphates, preferably condensed aluminum phosphates in combination with water-soluble alkali silicates.

30 Claims, No Drawings

ELECTRICALLY CONDUCTIVE MICROCAPILLARY COMPOSITE MATRIX AND METHOD FOR PRODUCING SAME

The invention relates to an electrically conducting microcapillary composite matrix and to a method for producing the same, which matrix is suitable for the making of weathering-resistant, durable and acid-resistant electrically conducting coats of paint and coatings and, in particular, as anode material for the cathodic corrosion protection of reinforcing steel in concrete.

The demands made on electrically conductive coatings or coats of paint which are suitable as anode for the cathodic protection of reinforcing steel in concrete are particularly high. As the skilled artisan knows, the cathodic protection is based on the lowering of the electric potential of the reinforcing steel by applying a so-called protective current that flows between the concrete surface mounted anode and the reinforcing steel (cathode). The flow of current is enabled by the electrolytic conductivity of the concrete and by the electrochemical reactions on the anode surface and the cathode surface (reinforcing steel). At the surface of the reinforcing steel, alkaline-acting hydroxyl ions are formed by the electrochemical reduction of oxygen, and at the anode surface, water is oxidized to oxygen; in the presence of chloride also chloric gas is formed, and moreover, acid is formed, i.e. one mole of acid for a charge equivalent of 96000 ampere seconds (Coulomb). At a mean, common current density of from 5 to 10 mA/m$^2$, this will correspond to approximately 0.2–0.4 l of conc. hydrochloric acid/year. The acid formed may attack both the anode as well as the concrete surface and destroy them. In principle, the equivalent amount of lye (hydroxyl ions) will form on the reinforcing surface. However, to neutralize the acid formed on the anode, the hydroxyl ions must diffuse through the concrete cover of the reinforcing steel to the concrete surface, usually approximately 2 to 3 cm. A diffusion of the acid (protons) in reverse direction is not possible since the acid reacts at the concrete surface with the hardened cement paste and, possibly, also with the additives, and is neutralized. Diffusion and electromigration of the hydroxyl ions through concrete is very slow, depending on the moisture content and the porosity of the concrete it will be approximately 100 to 1,000 times slower than in solution. Depending on the protective current density and the applied voltage it may thus take weeks to months until the acid formed at the anode is neutralized by the hydroxyl ions diffusing from the reinforcement to the concrete surface. For this reason, the anodically formed acid may attack and destroy both the anode and the concrete surface. Large pores and cavities will be formed in the surface layer of the concrete by the acid attack, which impede the diffusion of the hydroxyl ions and thus will even accelerate the destruction of the concrete surface.

Therefore, titanium nets which are acid and chlorine-resistant are commonly used as anode materials, their surfaces being modified with iridium oxide, ruthenium oxide, platinum, which nets are fixed on the concrete surface by means of air-placed concrete or air-placed mortar, the electrolytic contact with the concrete and with the reinforcing steel also being made thereby. Noble-metal oxide modified titanium nets are very expensive, and moreover, the application of a mortar layer on the concrete surface, primarily on roadways on bridges and in parking houses and on balconies, has disadvantages on account of the changes of the dimensions of the structure (e.g. increase in roadway height) and the additional weight of the mortar layer which may be up to 30 kg/m$^2$, which may considerably detract from the usability of the building. Since on account of the high costs, comparatively large-mesh Ti nets are used, high current densities may locally occur (50–100 mA/m$^2$) which may lead to local discoloration up to a destruction of the mortar.

More recently, thus also conductive paints containing graphite and/or soot as electrically conductive pigment in a polymer dispersion or carbon fibers in a cementous or also cement-free binder are used as anode materials. Such electrically conductive paints utilized as anode material are, e.g., disclosed in "John P. Broomfield, Corrosion of Steel in Concrete, E&FN Spon, London (1997), p. 128", and in EP 443229, EP 210058, GB 2140456, U.S. Pat. No. 4,632,777, U.S. Pat. No. 7,199,405A, JP 5070977. Disadvantages of these electrically conductive paints are their lack of oxidation and acid resistance, markedly lower durability than that of the titanium net/cement-mortar anode systems, insufficient durability in a humid environment, e.g. on construction elements which are exposed to rain or spray water, insufficient abrasion resistance as is required on traffic surfaces, and low conductivity so that the external current supply must occur at distances of from 0.5 to 1.0 m.

Such a commercially used system does have a sufficiently stable conductivity, yet it is not resistant to the oxidizing and acidic conditions at the borderline anode/concrete so that after a service life of 2 to 5 years the adhesion of the paint on the concrete surface clearly decreases and a destruction of the concrete surface due to acid attack can be observed. Moreover, the above-indicated paints lose their adhesion to the concrete surface as a consequence of the acid attack and thus may come off sooner or later, and the cathodic protection of the reinforcement thus will be lost. Another, commercially utilized painting system does have an improved adhesion on the concrete surface, yet its electric conductivity decreases very much in the course of operation.

Thus, it is the object of the present invention to provide a painting and coating agent with which electrically conducting coats of paint and coatings can be provided which not only are sufficiently resistant to an acid and chlorine attack but also protect the concrete surface from the attack of the anodically formed acid, which exhibit a uniform electric conductivity and a lasting adhesion to the concrete surface.

Electrically conductive paints comprised of a mixture of conductive pigments, such as, e.g., graphite, soot, nickel powder and a plastic dispersion have, e.g., been described in OE 325 180 or in EP 0230 303. However, due to their unsatisfactory durability under anodic load, these paints are not suitable as anode materials for the reasons set out above. Electrically conductive paints which contain graphite and/or soot and soluble silicates as binder as well as, optionally, synthetic resins, such as, e.g., polymethacrylic acid esters or an epoxy ester, have, e.g., been described in OE 325 180. In CH 572 966, an electrically conductive varnish has been described which preferably contains soot, an aqueous silicate solution and a non-ageing acryl resin dispersion. According to the specification, the above-indicated paints are suitable for producing heating films and/or as an electrostatic protection and/or as an electric shield. With such a use, an electric current is led through the coat of paint, there is, however, no anodic reaction, i.e. acid and gas formation as well as the formation of oxidizing products, such as oxygen and chloric gas, in particular the electric resistancee to the substrate is without any importance, which is quite in contrast to the use of electrically conductive coats of paint as anode materials for the cathodic protection of steel, in particular in concrete. Furthermore, it has been shown that electrically conductive paints which contain soluble silicates cannot be used under the conditions of the cathodic protection for the following reasons:

Both, the electric resistance of the paint itself, and the electric resistance between the paint functioning as anode and the reinforcement increase highly and, thus, the current density decreases.

After approximately 400,000 Coulomb (Ampère.seconds) have been passed through, the adhesion to the concrete substructure decreases by about 80% (55 mA/m$^2$, 75 days).

In EP 499437, the admixture of an alkaline buffer comprised of alkali hydroxides, to a cementous, electrically conductive coating has been described, for neutralizing the anodically formed acid and thus the risk of loosing the cathodic protection. In EP 581433B1, an electrically conductive coating comprised of an organic polymer matrix and containing electrically conductive pigments has been described which likewise contains an alkali buffer for preventing the enrichment of anodically formed acid in the electrically conductive coating during the operation of the cathodic protection system. Alkaline buffer materials, however, pose problems in two respects: on the one hand, they are neutralized by atmospheric carbonic acid, such as, e.g., concrete, and, on the other hand, large amounts of buffer material are required for neutralizing the anodically formed acid, e.g. approximately 160 g/m$^2$ of Ba(OH)$_2$*6H$_2$O or approximately 120 g/m$^2$ of potassium pyrophosphate or 56 g/m$^2$ of KOH for 100,000 Coulomb. With a common layer thickness of 0.1 mm, these amounts would have to be added to approximately 0.2 l of coating material, i.e. approximately 0.3 to 0.8 kg/l. As illustrated by the example given in EP 581433B1, the electric resistance already clearly increases after a service life of the cathodic protection of approximately 2 weeks and after approximately 220,000 Coulomb have been passed therethrough, and this indicates an exhaustion of the buffer material. This is also indirectly certified by the invention described in EP 499437: despite the very high buffer capacity of Portland cement, an addition of alkali hydroxides is necessary to ensure a sufficient buffer capacity.

Surprisingly it has now been shown that the admixture of alkali alumino-silicate gels, alkali alumino-hydroxo-complexes or the addition of selected curing agents to alkali silicate containing electrically conducting painting materials containing graphite powder and a synthetic resin dispersion lead to unexpected high durabilities, high adhesion values and nearly constant electric conductivity even after >500,000 Coulomb of protective current have been passed therethrough.

Surprisingly it has been found that the effect of these additives according to the invention mainly are not based on a chemical action, i.e. a buffer effect, but on a physical mode of action: The additives according to the invention cause the formation of extremely fine-porous structures in the pore spaces of the surface layer of the concrete. These extremely fine-porous structures form a network of capillary pores. As the skilled artisan knows, vapor pressure in the capillaries is lowered, and this then will lead to increased condensation of water vapor in the pores, as compared to untreated concrete, and thus to a concrete surface layer having a large portion of water-filled capillary pores. With a moisture gradient between the concrete interior and the concrete surface, the capillary suction forces will cause a conveyance of the pore solution to the concrete surface. With the pore solution, the hydroxyl ions formed at the reinforcement during the cathodic protection are transported to the concrete surface and there will neutralize the anodically formed acid. Moreover, the water-filled capillary network facilitates diffusion of the hydroxyl ions, since ion diffusion in the pore spaces of porous materials can only occur in water-filled pore spaces. Pores of large pore diameter dry out more rapidly and then will block the diffusive ion transport. This is particularly so in old, weather-beaten concrete which is often found if corrosion of the reinforcement occurs. Furthermore, the water-filled capillary surface layer counteracts the electro-osmotic effect of the cathodic protection. The electro-osmotic effect will cause a conveyance of the surface moisture from the anode to the cathodically polarized reinforcement. Under the conditions of the cathodic protection with conventional electrically conductive coats of paint and coatings, this will cause drying out of the surface layer of the concrete. In this manner, the sensitivity of the concrete surface relative to the attack of anodically formed acid will be increased. The capillary suction forces of the inventive capillary structures in the pore spaces of the concrete surface will neutralize this electro-osmotic effect.

A prerequisite for the effectiveness of these capillary structures is, however, that the capillary pores remain interconnected and are not closed, e.g., by chemical reactions. This is, e.g., observed if waterglass (dissolved alkali silicates) is used alone or in combination with conventional curing agents as additives. The silica gel formed closes the pores in the course of cathodic protection and thus increases the electric resistance of the concrete surface and thus also prevents the conveyance of the anodically formed hydroxy-lions to the concrete surface. The anodically formed acid initially accelerates gelling of the waterglass and thus pore closure, and consequently will not only destroy the concrete at the surface, but will also cause the formation of microcrystalline SiO$_2$ of a sandy consistency. This will lead to a loss of adhesion of the anodic coat of paint and, thus, to the loss of the corrosion protection of the reinforcing steel.

A prerequisite for the formation of the inventive capillary structures and matrix which can also be denoted as a composite material or composite matrix between the inventive painting or coating agent and the concrete is the penetration of the paint and coating agent into the pore spaces of the concrete surface, and the formation of the microcapillary structures in the pore spaces. Moreover, these structures must be sufficiently resistant to the anodically formed acid. This means that the starting substances from which these structures form must be present in water-dissolved or colloidal form. Preferably, the inventive microcapillary composite matrix is a material which permanently increases the strength of the surface layer of the concrete and thus ensures good adhesion and thus high adhesive pull strengths of the electrically conductive coating material according to the invention. This will be of particular advantage if electrically conductive paints or coatings are applied to highly weather-beaten or corroded concrete surfaces.

Thus, the invention is directed to a painting material which is characterized in that it forms a microcapillary composite matrix with the surface layer of concrete, which composite matrix is resistant to weak acids. The composite matrix according to the invention is further characterized in that the capillaries are interconnected and the capillary network is connected with the underlying concrete. In the composite matrix according to the invention, the portion of microcapillary pores (<50 nm) of the capillary porosity is significantly higher than in the underlying concrete matrix. The capillary network furthermore is characterized in that it allows for a conveyance of ions, in particular of hydroxyl ions both on account of capillary suction forces and by molecular diffusion, and that at equal relative moisture, the negative pore water pressure in the inventive microcapillary composite matrix is significantly higher than in the underlying concrete matrix. The inventive microcapillary composite matrix preferably increases the strength of the concrete surface. Furthermore, the coating material with which the microcapillary composite matrix is produced preferably is electrically conducting and preferably is suitable as a durable, weathering-resistant anode for the cathodic corrosion protection. Moreover, the specific electric resistance of the coat of paint according to the invention does not significantly increase during the operation of the cathodic protection system. Furthermore, the painting material according to the invention is characterized in that the adhesive pull strengths do not fall below 1.0 MPa, preferably, however, do not fall below 1.5 MPa, even if the cathodic protection system is operated for several years. The invention is also directed to the production of a microcapillary composite matrix with an electrically non-conductive coating material, wherein subsequently a common electrically conductive coat of paint or coating is applied as anode for the cathodic protection.

One possible way of producing the microcapillary composite matrix according to the invention consists, e.g., in admixing alumino-hydroxo-complexes $M_xAl(OH)_y$, with M=Na, K and $1 \geq x \leq 3$ and $4 \geq y \leq 6$, to an electrically conductive painting material; wherein the alumino-hydroxo-complexes $M_xAl(OH)_y$ are preferably prepared by dissolving aluminum hydroxide, or sodium and/or potassium aluminate of the formula $MAlO_2$ in an alkali hydroxide solution MOH, with M=Na, K, Na, and with the ratio of $MOH/Al_2O_3>2$. Good results are obtained with $MOH/Al_2O_3$-ratios of from 2.5 to 3.5 in a solution containing 2.25 mol/l calculated as $Al_2O_3$. Due to the low solubility of $NaAlO_2$, dissolution of the latter preferably is effected in a hot alkali hydroxide solution. The painting material according to the invention furthermore is characterized in that its pH is more than 11, preferably more than 12, so as to ensure a sufficient concentration of dissolved alkali alumino-hydroxo-complexes. To ensure this, the painting material according to the invention is characterized in that it does not contain any alkaline earth ions. The painting material according to the invention contains at least 0.1% by weight, preferably 0.15% by weight to 2% by weight, of alumino-hydroxo-complexes $M_xAl(OH)_y$, calculated as $Al_2O_3$.

A further possible way of producing the microcapillary composite matrix according to the invention consists, e.g., in admixing a water-soluble alkali silicate and/or an alkali silicate solution and a suitable curing agent, preferably aluminum phosphate, in particular a condensed aluminum phosphate, such as is described in DE-A-3006551 or in EP 0 133 953, to an electrically conductive coating material. As the soluble silicate, preferably alkali silicates of the formula (I)

$$a(M_2O)*x(SiO_2)*y(H_2O), \qquad (I)$$

with M=Li, Na, K, and $3 \geq x/a \leq 0.5$. Good results are obtained with potassium silicates and/or sodium silicated with $1 \geq x/a \leq 0.5$. The alkali silicate-containing painting material according to the invention furthermore is characterized in that its pH is more than 10, preferably more than 12. According to the invention, the painting material comprises at least 0.5 % by weight, preferably 1% by weight to 10% by weight, of a water-soluble alkali silicate, calculated as $SiO_2$, and preferably 0.5 to 5% by weight of condensed aluminum phosphate.

That possible way of producing a microcapillary composite matrix which is preferred according to the invention consists in admixing a water-dissolved or colloidally distributed alkali-alumino-silicate of the summation formula $aM_2O*bAl_2O_3*cSiO_2$ to an electrically conductive painting material, as well as, optionally, micro-silica, reactive aluminosilicates, Kieselsol, soluble alkali silicates, with the total ratio $SiO_2/Al_2O_3 \leq 1$ and $\geq 40$, and the ratio $M_2O/Al_2O_3 \leq 1$ and $\geq 25$, with M=Li, Na, K. The painting material which, according to the invention, comprises at least one alkali alumino-silicate furthermore is characterized in that alkali alumino-silicate preferably is prepared by mixing a water-soluble silicate and/or a Kieselsol with at least one water-dissoved alumino-hydroxo-complex $M_xAl(OH)_y$, with M=Na, K and $1 \geq x \leq 3$ and $4 \geq y \leq 6$. As the soluble silicates, the above-described alkali silicates are suitable. As the alumino-hydroxo-complexes, also the above-described alumino-hydroxo-complexes are suitable, which preferably are prepared by dissolving aluminum hydroxide, or sodium and/or potassium aluminate of the formula $MAlO_2$ in an alkali hydroxide solution MOH, with M=Na, K, Na, wherein the ratio of $MOH/Al_2O_3>2$. According to the invention, the painting material contains at least 0.5% by weight, preferably 1% by weight to 10% by weight, of a water-soluble and/or colloidally dispersed alkali-alumino-silicate, calculated as total $SiO_2$. The painting material which, according to the invention, preferably contains alkali alumino-silicate, does not contain any alkaline earth cations.

As the painting material, preferably electrically conductive paints are suitable. The painting material must be compatible and miscible with the admixed binders which produce the microcapillary composite matrix according to the invention, and, in particular, it should not coagulate. Suitable electrically conductive painting materials are, e.g., mixtures of at least one synthetic resin dispersion with electrically conducting pigments.

As the synthetic resin dispersion, all synthetic resins may be used which do not coagulate in aqueous dispersions at pH >11. In practice, a hydrolysis resistance of the synthetic resin dispersion at pH>12 is advantageous. Suitable are, e.g., epoxy resins, phenol resins, polyether-polyimides, polyether-polyketones, polyimide-polyethers, polysulfones, siloxanes and silicones, acrylic resins, butadiene-styrene copolymers, in particular, however, chloroprene, latex, styrene-butadiene copolymers, carboxylated styrene-butadiene copolymers.

The electrically conductive pigments may, e.g., consist of carbon, graphite, carbon black, acetylene black, nickel, noble metals, noble-metal-coated metals or non-metals, molybdenum disilicide, $TiO_x$ (x<2.0), $SnO_2$, or a mixture of the pigments mentioned. Preferably, however, graphite is used. Good results are obtained with mixtures consisting of a 50% carboxylated styrene-butadiene copolymer dispersion in water and graphite powder, 40–60% by volume, based on the volume of the air-dried coats of paint.

The production of an electrically conductive painting material comprising the binder preferred according to the invention, preferably is effected by mixing a component which contains the dissolved silicate and/or Kieselsol, optionally micro-silica, reactive alumino-silicates, such as metakaolin, as well as at least one plastic dispersion, the conductive pigment and, optionally, additives, such as, e.g., thickening agents, water retention agents, dispersing agents (component A), with a water-dissolved aluminot-hydroxo-complex $M_xAl(OH)_y$ (component B). After mixing of component A with component B, the painting material can be used for approximately 1 to 10 hours, depending on its composition ($SiO_2/Al_2O_3$ ratio, $M_2O/Al_2O_3$ ratio, type of cations). A further possibility according to the invention consists in admixing, as component B, an aluminum phosphate, preferably a condensed aluminum phosphate prepared according to U.S. Pat. No. 3,445,257, instead of the dissolved alumino-hydroxo-complex, it also being possible to admix the aluminum phosphate in combination with alkali orthophosphates.

Depending on the demand and requirements, the electrically conductive painting material containing the binder according to the invention can be applied to the concrete surface in thin layers (25–100 μm) or in thicker layers (100–500 μm) by means of known technologies (paint brush, roller, spraying machine), and after curing, it forms a film having a specific resistance of <2 ohm.cm, preferably <0.5 ohm.cm. To ensure the formation of the microcrystalline composite matrix according to the invention, the coat should cure at least 1 week, preferably 3 to 4 weeks, before taking the cathodic protection system into operation.

As compared to conventional electrically conductive coats of paint which employ anode materials for the cathodic protection, the coats of paint containing one of the additives according to the invention which cause the formation of the inventive microcapillary composite matrix are characterized by a merely slight change of the specific resistance of the coat, even after a current uptake of >500,000 coulombs (current density of <100 $mA/m^2$). Likewise, the electric resistance between the anode and the reinforcement embedded in the concrete changes only slightly, whereas in conventional coats of paint both the specific electric resistance of the coat of paint and also that between anode and reinforcement increases very much under anodic load.

A further advantage of coats of paint comprising one of the additives according to the invention is their lasting high adhesion to the concrete substrate, even after a high current uptake and comparatively high current densities: the adhesive pull strengths increase at a current density of <100 $mA/M^2$ after a current uptake of >500,000 coulomb by <50%, yet, preferably, they remain unchanged. Common coats of paint lose their adhesion to the concrete substrate after some time, particularly at high current densities.

As compared to conventional coats of paint, coats of paint containing aluminum-silicate gel or soluble silicate in combination with aluminum phosphate as curing agent are characterized by a high mechanical stability, in particular weathering resistance and durability in a humid environment and high adhesive pull strengths. Moreover, the surface layer of concrete of poor quality is further hardened even during application of the cathodic protective current, and the adhesive pull strengths may increase by more than 100%. This is particularly true of alluminium-silicate gel containing coats of paint. This has the advantage over conventional coats of paint that concrete surfaces as well as concrete surfaces which have already corroded can be coated without a substantial surface treatment. Conventional coats in most instances require a well-cleaned and prepared and mostly dry concrete surface.

The above-mentioned advantages are due to the specific properties of the microcapillary composite matrix according to the invention which forms in the surface layer of the concrete, in particular to the acceleration of the conveyance of hydroxyl ions from the reinforcement into the concrete surface. It is assumed that in the pore spaces, zeolite-like structures form from the alumino-silicate gel, which structures consist of a dense assembly of microcrystals. These zeolite-like structures act as ion conductors and ion exchangers. Zeolites are known ion conductors and ion exchangers and are used as solid electrolyte in solids batteries. The assumption that these are zeolite-like structures is supported by the observation that when using sodium aluminium silicate gels, the electric resistance to the reinforcement is markedly lower than when using potassium alumino-silicate gels. Similar structures seem to form when using aluminum phosphate as the component B. Aluminum phosphate, however, has the disadvantage that it is only effective in mixtures with high pH values (pH >13). Aluminum phosphate, moreover, is highly acidic, and at too low pH values, it may lead to a rapid gelling of the solubilized alkali silicate merely by its acid action without the formation of the inventive microcapillary composite matrix. Alkali alumino-silicate gels have the advantage that initially they are homogenously dissolved in the painting material and/or homogoenously colloidally distributed and thus will homogenously spread both in the painting material and in the pore spaces of the surface layer of the concrete. This homogenous distribution has a very favorable effect on the formation of the inventive microcapillary composite matrix. Such a homogenous distribution is only partly present or can be attained only with higher efforts if powderized additives, such as, e.g., aluminum phosphates, are used. When using alumino-hydroxo-complexes $M_xAl(OH)_y$ alone as additive according to the invention it is assumed that polynuclear aluminum hydroxides will form in the pore spaces. It is, e.g., known that in the pH range of from 4 to approximately pH 10, different polynuclear basic aluminum hydroxide compounds are formed together with gibbsite. Such a polynuclear compound is, e.g., $Al_{13}O_4(OH)_{24}H_2O_{12}^{7+}$. It is assumed that these amorphous to crystalline aluminum hydroxide compounds form the structure elements of the microcapillary composite matrix according to the invention. In concrete that is not too old, calcium aluminate hydrates and ettringite may additionally form which may lead to increased strengths.

In principle, a microcapillary composite matrix may also be formed by injection of microcement emulsions into the concrete surface. However, the production of such a composite matrix involves high expenditures and is not resistant to weak acids. Such a composite matrix does have advantages over conventional painting materials, yet not over composite matrices produced with alumino-silicates or with silicate/aluminum phosphates.

The microcapillary composite matrix according to the invention may also be used for the production of durable, weathering-resistant and high-strength electrically conductive coatings which are particularly suitable as anode materials for cathodic protection.

For producing the coatings according to the invention, instead of electrically conductive pigments, carbon fibers are admixed to component A of the inventive painting material. At layer thicknesses of >1 mm, preferably further additives, such as are used e.g. for the production of mortar, are admixed. Preferably, the additives are admixed prior to the use of the painting material and prior to the addition of component B. As the additives, e.g. drift sand, silica sand, as well as for particularly high abrasion-proof coatings, corundum, α-alumina are suitable, for the production of heat-insulating coatings foamed glass beads, hollow aluminum silicate beads, expanded clay beads are suitable. The grain size of the fillers preferably is smaller than or equal to half the layer thickness. As carbon fibers, commercially available electrically conductive carbon fibers are suitable, such as, e.g., PAN fibers and/or graphite fibers. The lengths of the carbon fibers preferably are less than the layer thickness of the air-dried coating. The amount of carbon fibers required for a sufficient conductivity of the coating according to the invention will depend on their lengths and will decrease with the square of the length of the carbon fibers. For instance, if the carbon fibers have a mean length of 0.5 mm and a diameter of 7 μm, according to the invention 10–50% by volume, preferably, however, 15 to 25% by volume, based on the volume of the air-dried coating, will be admixed to the painting agent.

A further advantageous method for producing the electrically conductive coatings according to the invention is, similar to the dry silicate mortar mixtures described, e.g., in EP 0 133 953 and EP 0 554 757, to produce component A of the binder acording to the invention as a dry mixture containing water-soluble alkali silicates, fillers, preferably a synthetic resin dispersion, optionally dispersing agents, thickening agents, water retention agents, film forming agents as well as optionally reactive silicate- and aluminosilicate pigments. According to the invention, the dry mixture is mixed with the appropriate amount of water prior to the use thereof, and during the mixing process, the appropriate amount of carbon fibers and component B are admixed. The best results are obtained with water-dissolved alumino-hydroxo-complexes $M_xAl(OH)_y$ as the component B. Satisfactory results are, however, also obtained with aluminum phosphates as the component B, which may already be added to the dry mixture. The coating material according to the invention will be applied by commonly used methods, such as used e.g. for applying mortar casts, silicate mortars and masses on building materials. Analogous to the electrically conducting painting materials, coatings should cure for at least 1 week, preferably 3 to 4 weeks before the cathodic protection system is taken into operation so as to allow for the formation of the microcrystalline composite matrix according to the invention.

Surprisingly it has been shown that in contrast to conventional electrically conductive coatings, e.g. as described in EP 0 581 433, non-treated carbon fibers can be admixed. Particularly in cementous coatings, yet also in cement-free coatings, the specific electric resistance, in particular the resistance to the reinforcement, will highly increase during the operation of the cathodic protection system. As the skilled artisan knows, as anodic reaction, mainly water is oxidized to oxygen in the weakly to highly alkaline range. In the weakly alkaline to neutral range there will be an additional oxidation of chloride to chloric gas, if present. In the neutral to weakly acidic range, however, graphite itself will be oxidized to carbon dioxide. As shown by electromicroscopical examinations, this $CO_2$ production leads to the formation of an electrically insulating layer on the carbon fibers, particularly in cementous coatings. In coatings comprising additives which lead to the formation of the microcapillary composite matrix according to the invention, this is not observed, and the specific electric resistance and the resistance to the anode increases only slightly during the operation of the cathodic protection system. This is mainly attributed to the absence of alkaline earth ions which quite substantially participate in the formation of the insulating protective layer, yet in particular also to the weakly alkaline environment within the coating itself.

Due to its acid-resistance and the highly strengthening effect, the alumino-silicate containing painting and coating material according to the invention is also suitable for the production of microcapillary composite matrices which increase the durability of porous mineral materials.

In the following, examples of the invention and comparative examples are given. Contents parameters of solutions are given in mass %/volume.

EXAMPLE 1

An electrically conductive painting material having the following composition was prepared:

| Component | Ingredient | Parts by weight |
|---|---|---|
| A | Potassium silicate solution (31.5% $SiO_2$, 14.8% $K_2O$) | 59 |
| | Aqueous 50% carboxylated poly-butadiene-styrene copolymer dispersion, | 208 |
| | Butyl-glycol-ether | 2.25 |
| | Graphite powder | 180 |
| | Deionized water | 80 |
| B | $Na_x[Al(OH)_{3+x}]$ solution (38.6% $Al_2O_3$, 54.5% $Na_2O$) | 5.3 |

The sodium-aluminohydroxo-complex solution was prepared by dissolving 620 g $NaAlO_2$ in 820 ml of boiling 1 molar NaOH under stirring in a vessel of special steel. The potassium silicate solution was a commercially available solution.

The $SiO_2/Al_2O_3$ ratio was 15.92, the $M_2O/Al_2O_3$ ratio was 5.91.

The coat was applied with a paint brush in two layers on mortar prisms aged 1 year (23*23*4 cm, 400 kg Portland cement/$m^3$ drift sand 0/5 mm, w/c=0.50, 0.5% of NaCl) containing a lattice of reinforcing steel in their middle. The surface of the mortar prisms was roughly ground before application of the coat of paint. On two opposite sides, copper wires having a niobium and platinum coated surface were embedded at a distance of 20 cm. The layer thickness of the air-dried coat of paint was approximately 300 μm. The specific electric resistance (1 kHz) was 0.42 ohm.cm. The adhesive pull strength of the coat of paint was 1.37 MPa after a drying time of 48 h (65% relative humidity of air); after 40 days, after 450,000 Coulomb (2.2 V, 130 mA/$m^2$) had been passed therethrough, the adhesive pull strength had increased by 22.6% to 1.68 MPa. When testing the adhesive pull strengths, the tear occurred in the mortar itself in each case.

EXAMPLE 2

An electrically conductive painting material having the following composition was prepared:

| Component | Ingredient | Parts by weight |
|---|---|---|
| A | Sodium silicate solution (18.61% $SiO_2$, 19.21% $Na_2O$) | 69 |
| | Aqueous 50% dispersion of a poly-styrene acrylic ester copolymer in water | 208 |
| | Methyl-hydroxy-ethyl-cellulose, MW 6000 | 1.4 |
| | 30% solution of a poly-acrylate-based dispersing agent | 3.5 |
| | Butyl-glycol ether | 2.25 |
| | Graphite powder | 180 |
| | Deionized water | 60 |
| B | $Na_x[Al(OH)_{3+x}]$ solution (38.6% $Al_2O_3$, 54.5% $Na_2O$) | 5.3 |

The sodium-aluminohydroxo-complex solution was prepared as described in Example 1, the sodium silicate solution was commercially obtainable waterglass.

The $SiO_2/Al_2O_3$ ratio was 6.7, the $M_2O/Al_2O_3$ ratio was 7.8.

The coat was applied with a paint brush in one layer as described in Example 1. The layer thickness of the air-dried coat was approximately 150 µm. The specific electric resistance (1 kHz) was 3.05 ohm.cm. The adhesive pull strength of the coat was 0.58 MPa after a drying time of 48 h (65% relative humidity of air); after 41 days, after 500,000 Coulomb (2.8 V, 90 mA/m$^2$) had been passed therethrough, the adhesive pull strength had increased by 69% to 1.04 MPa. When testing the adhesive pull strengths, the tear always occurred in the mortar itself. This example shows that a highly weather-beaten concrete (low adhesive pull strength) still is highly strengthened by the binder despite acid production at the surface.

EXAMPLE 3

For a comparison, an electrically conductive painting material having the composition described in the table below was prepared. As a binder, the painting material only contained waterglass in addition to a synthetic resin dispersion.

The coat was applied to a mortar prism as described in Example 1. The layer thickness of the air-dried coat was approximately 300 µm. The specific electric resistance (1 kHz) was 0.42 ohm.cm. The adhesive pull strength of the coat was 1.62 MPa after a drying time of 48 h (65% relative humidity of air); after 75 days, after 350,000 Coulomb (2.2 V–7.8 V, 55 mA/m$^2$) had been passed therethrough, the adhesive pull strength had decreased by 80% to 0.30 MPa.

| Ingredient | Parts by weight |
| --- | --- |
| Potassium silicate solution (31.5% SiO$_2$, 14.8% K$_2$O) | 59 |
| Aqueous 50% dispersion of a poly-styrene-acrylic ester copolymer in water | 208 |
| Methyl hydroxy ethyl cellulose, MW 6000 | 1.4 |
| 30% solution of a polyacrylate-based dispersing agent | 3.5 |
| Butyl-glycol-ether | 2.25 |
| Graphite powder | 180 |
| Deionized water | 80 |

When testing the adhesive pull strengths, the tear occurred in the coat in the first test (48 h), and in the mortar itself in the second test. This shows that the concrete surface had been highly attacked by the anodically formed acid. Moreover, both the specific electric resistance of the coat and also the electric resistance between the coat and the reinforcement embedded in the mortar increased highly, and therefore a continuous increase of the voltage applied was necessary.

EXAMPLE 4

An electrically conductive painting material containing only sodium alumino-hydroxo-complex and having the following composition was prepared:

| Ingredient | Parts by weight |
| --- | --- |
| Na$_x$[Al(OH)$_{3+x}$] solution (38.6% Al$_2$O$_3$, 54.5% Na$_2$O) | 5.3 |
| Aqueous 50% dispersion of a poly-styrene-acrylic ester copolymer in water | 208 |
| Methyl hydroxy ethyl cellulose, MW 6000 | 1.4 |
| 30% solution of a polyacrylate-based dispersing agent | 3.5 |
| Butyl-glycol-ether | 2.25 |
| Graphite powder | 180 |
| Deionized water | 120 |

The sodium aluminohydroxo-complex solution was prepared as described in Example 1.

The coat was applied in one layer with a paint brush as described in Example 1. The layer thickness of the air-dried coat was approximately 150 µm. The specific electric resistance (1 kHz) was 1.5 ohm.cm. The adhesive pull strength of the coat was 1.59 MPa after a drying time of 48 h (65% relative humidity of air); after 80 days, after approximately 500,000 Coulomb (2–6 V, 70 mA/m$^2$) had been passed therethrough, the adhesive pull strength had decreased by 30% to 1.10 MPa. When testing the adhesive pull strengths, the tear occurred always in the mortar itself.

EXAMPLE 5

An electrically conductive painting material having the composition described in the table below was prepared. The coat was applied to mortar prisms as described in Example 1. The layer thickness of the air-dried coat was approximately 300 µm. The specific electric resistance (1 kHz) was 0.95 ohm.cm. The adhesive pull strength of the coat was 2.10 MPa after a drying time of 48 h (65% relative humidity of air); after approximately 70 days, after 500,000 Coulomb (2.3 V, 80 mA/m$^2$) had been passed therethrough, an adhesive pull strength could no longer be measured, the coat had become crumbly and could easily be pulled off the concrete which had become sandy by the acid attack.

| Component | Ingredient | Parts by weight |
| --- | --- | --- |
| | Aqueous 50% carboxylated polybutadiene-styrene copolymer dispersion | 208 |
| | Butyl-glycol-ether | 2.25 |
| | Graphite powder | 180 |
| | Deionized water | 80 |

EXAMPLE 6

An electrically conductive painting material having the composition described in the table below was prepared. The potassium-aluminohydroxo-complex solution was prepared by dissolving 866 g of aluminium hydroxide in 1000 ml of boiling 13 molar KOH under stirring in a vessel of special steel. The potassium silicate solution was a commercially available solution.

| Component | Ingredient | Parts by weight |
| --- | --- | --- |
| A | Potassium silicate solution (40.43% SiO$_2$, 43.3% K$_2$O) | 59 |
| | Aqueous 50% carboxylated polybutadiene styrene copolymer dispersion | 208 |
| | Butyl-glycol ether | 2.25 |
| | Graphite powder | 180 |
| | Deionized water | 80 |
| B | K$_x$[Al(OH)$_{3+x}$] solution (56.4% Al$_2$O$_3$, 61.5% K$_2$O) | 4.7 |

The $SiO_2/Al_2O_3$ ratio was 15.3, the $M_2O/Al_2O_3$ ratio was 11.6.

The coat was applied to mortar prisms as described in Example 1. The layer thickness of the air-dried coat was approximately 250 μm. The specific electric resistance (1 kHz) was 0.65 ohm.cm. The adhesive pull strength of the coat was 3.05 MPa after a drying time of 48 h (65% relative humidity of air); after 40 days, after 500,000 Coulomb (2.1 V, 140 mA/m2) had been passed therethrough, the adhesive pull strength had not changed significantly. When testing the adhesive pull strengths, the tear always occurred in the mortar itself.

EXAMPLE 7

An electrically conductive painting material having the following composition was prepared:

| Component | Ingredient | Parts by weight |
| --- | --- | --- |
| A | Potassium silicate solution (40.43% $SiO_2$, 43.3% $K_2O$) | 59 |
|   | Aqueous 50% carboxylated polybutadiene-styrene copolymer dispersion | 208 |
|   | Butyl-glycol ether | 2.25 |
|   | Graphite powder | 180 |
|   | Deionized water | 80 |
| B | Condensed aluminum phosphate | 6.7 |

The coat was applied to mortar prisms as described in Example 1. The layer thickness of the air-dried coat was approximately 300 μm. The specific electric resistance (1 kHz) was 1.05 ohm.cm. The adhesive pull strength of the coat was 2.55 MPa after a drying time of 48 h (65% relative humidity of air); after 40 days, after 500,000 Coulomb (2.1 V, 140 mA/$M^2$) had been passed therethrough, the adhesive pull strength had merely decreased by 25% to 1.91 MPa. When testing the adhesive pull strengths, the tear always occurred in the mortar itself.

EXAMPLE 8

An electrically conductive painting material having the composition described in the table below was prepared. The sodium-aluminohydroxo-complex solution was prepared as described in Example 1, the sodium silicate solution was a commercially available waterglass.

The coat was applied with a spatula on mortar prisms from Example 1, and electrical contacts were embedded as described in Example 1. The layer thickness of the air-dried coat was approximately 2 mm. The specific electric resistance (1 kHz) was 2.0 ohm.cm. The adhesive pull strength of the coat was 2.23 MPa after a drying time of 24 h (65% relative humidity of air); after 65 days, after approximately 400,000 Coulomb (3.7 V, 70 mA/$m^2$) had been passed therethrough, the adhesive pull strength had increased by 57.0% to 3.05 MPa. When testing the adhesive pull strengths, the tear occurred within the coating after the first test (24 h), at the second test (65 days) it always occured in the mortar itself. The example shows that also a concrete of high quality (high adhesive pull strength) is even highly strengthened by the binder despite the acid production at the surface. The overall $SiO_2/Al_2O_3$ ratio was 4,14, the overall $M_2O/Al_2 O_3$ ratio was 1.01.

| Component | Ingredient | Parts by weight |
| --- | --- | --- |
| A | Poly styrene-butylacrylate copolymer | 50 |
|   | Soluble potassium silicate (56.0% $SiO_2$, 28% $K_2O$) | 60 |
|   | Dry mixture meta-kaolin | 40 |
|   | Methyl hydroxy ethyl cellulose, MW 6000 | 1.0 |
|   | Silica sand 0–1 mm | 200 |
|   | Graphite fibers, length 0.5 mm, diameter 7 μm | 50 |
|   | Deionized water | 80 |
| B | $K_x[Al(OH)_{3+x}]$ solution (56.4% $Al_2O_3$, 61.5% $K_2O$) | 10 |

EXAMPLE 9

A sodium-aluminohydroxo-complex solution having the components listed below was prepared:

| Ingredient | Parts by weight |
| --- | --- |
| Sodium aluminate | 6.28 |
| Sodium hydroxide | 1.05 |
| Tartaric acid | 0.50 |
| Demin. water | 17.36 |

At first, sodium hydroxide and tartaric acid were dissolved in demineralized water and then the sodium aluminate, at a temperature of from 60–80° C. The sodium-aluminohydroxo-complex solution had a specific weight of 1.326.

EXAMPLE 10

Component A of an electrically conductive painting material having the composition given in the table below was prepared. A conductive coat was prepared by mixing 100 parts by weight of component A with 2 parts by weight of a sodium-aluminohydroxo-complex solution according to Example 9.

The $SiO_2/Al_2O_3$ ratio was 14.75, the $M_2O/Al_2O_3$ ratio was 12.51. The coat was applied with a paint brush in one layer as described in Example 1.

| Ingredient | Parts by weight |
| --- | --- |
| Potassium silicate solution (23.8% $SiO_2$, 11.2% $K_2O$) | 59 |
| Aqueous 50% carboxylated poly-butadiene-styrene copolymer dispersion | 200 |
| Potassium hydroxide (KOH) | 5.65 |
| Butyl-glycol | 7.5 |
| Methyl hydroxy ethyl cellulose, MW 6000 | 1 |
| Graphite powder | 160 |
| Deionized water | 80 |

The layer thickness of the air-dried coat was approximately 150 μm. After approximately 20 h, a second layer was applied. The total layer thickness was 250 μm. The specific electric resistance (1 kHz) was 0.80 ohm.cm. The adhesive pull strength of the coat was 1.90 MPa after a drying time of 48 h (65% relative humidity of air); after 41 days, after 500,000 Coulomb (2.8 V, 75 mA/$m^2$) had been passed therethrough, the adhesive pull strength had increased by 10% to 2.10 MPa and remained unchanged after further 250,000 Coulomb. When testing the adhesive pull strengths, the tear always occurred within the mortar itself.

EXAMPLE 11

Component A of an electrically conductive painting material having the following composition was prepared:

| Ingredient | Parts by weight |
|---|---|
| Sodium silicate solution (26.8% $SiO_2$, 8.0% $Na_2O$) | 51 |
| Aqueous 50% carboxylated poly-butadiene-styrene copolymer dispersion | 200 |
| Sodium hydroxide (NaOH) | 12.80 |
| Butyl-glycol | 7.5 |
| Methyl hydroxy ethyl cellulose, MW 6000 | 1 |
| Graphite powder | 160 |
| Deionized water | 110 |

A conductive coat was prepared by mixing 100 parts by weight of component A with 2 parts by weight of a sodium aluminohydroxo-complex solution according to Example 9.

The $SiO_2/Al_2O_3$ ratio was 3.94, the $M_2O/Al_2O_3$ ratio was 5.62.

The coat was applied with a paint brush in one layer as described in Example 1. The layer thickness of the air-dried coat was approximately 125 μm. After approximately 20 h, a second layer was applied. The total layer thickness was 250 μm. The specific electric resistance (1 kHz) was 0.50 ohm.cm. The adhesive pull strength of the coat was 2.10 MPa after a drying time of 48 h (65% relative humidity of air); after 41 days, after 500,000 Coulomb (2.8 V, 75 mA/m$^2$) had been passed therethrough, the adhesive pull strength had increased by 15% to 2.40 MPa and remained unchanged after further 250,000 Coulomb. When testing the adhesive pull strengths, the tear always occurred within the mortar itself.

The development of the electric, overall resistances between anode and reinforcement of selected examples as compared to the example given in EP 0 581 433 is given in the table below. The resistance values listed in the table below have been calculated from the current/voltage values according to formula (II) which had been registered by means of data logger while the protective current was being passed through.

$$R_{tot,\Omega} = \frac{U_{anode/reinforcement}}{I_{anode/reinforcement}}, \quad (II)$$

U . . . voltage in V, I . . . current in A, R . . . resistance in Ohm.

| Days | EP 0581433 Ni fibers + buffer Ohm | Example 8 alumino-silicate C fibers Ohm | Example 1 K-alumino-silicate Ohm | Example 2 Na-alumino silicate Ohm | Ex. 3 K-silicate Ohm |
|---|---|---|---|---|---|
| 1 | 348 | 580 | 480 | 259 | 604 |
| 10 | 804 | 456 | 570 | 302 | 783 |
| 11 | 494 | 463 | 449 | 272 | 798 |
| 12 |  | 486 | 455 | 277 | 926 |
| 13 | 836 | 481 | 458 | 274 | 1032 |
| 20 | 1042 | 434 | 456 | 283 | 1339 |
| 25 | 1316 | 524 | 387 | 253 | 1986 |
| 27 | 1858 | 430 | 391 | 268 | 2373 |
| 31 | 2322 | 514 | 404 | 261 | 2385 |
| 32 |  | 559 | 407 | 263 | 2425 |
| 33 |  | 620 | 404 | 272 | 2486 |
| 40 |  | 539 | 394 | 269 | 2871 |
| 43 |  | 628 | 424 | 263 | 2650 |
| 66 |  |  | 451 | 284 | 5130 |

The making of the coat on the mortar prisms and the carrying out of the cathodic polarization of the reinforcement have been described in the examples give. The resistance values show that the micorcapillary composite matrix of the invention allows for an almost constant flow of current, whereas the use of soluble silicates alone (waterglass, Example 3), or a buffer system (example from EP 0581433), the electric resistance increases continuously and thus requires a continuous readjustment of the voltage applied. Thus, in Example 3, the voltage had to be increased continuously from 2.0 to 8.0 V, yet the current still decreased from 4.7 mA to 1.4 mA, whereas in the mortar prisms whose concrete surface had been modified with the microcapillary composite matrix according to the invention, in the voltage range of from 1.3 to 1.95 V, a current flow of from 4.9 to 6.9 mA (Example 2), in the voltage range from 2.0 to 2.8 V, a current flow of from 4.0 to 6.4 mA (Example 1), and in the current range of from 1.9 to 3.0 V, a current flow of from 4.5 to 6.9 mA could be maintained. In the example from EP 0 581 433, an increase of the voltage from 2.47 V to 11.61 V was required to maintain a constant current of 5 mA. A high increase of the electric resistance may locallylead to the loss of the cathodic protection of the reinforcing steel.

What is claimed is:

1. A mortar or concrete product comprising an electrically conductive microcapillary matrix coating material contained in the surface layer of the product, said coating material having admixed therein at least one compound selected from the group consisting of
   (i) alumino-silicates of the summation formula $aM_2O*bAl_2O_3*cSiO_2$, with a ratio c/b ranging from 1 to 40, and a ratio a/b ranging from 1 to 25, and with M representing Li, Na or K,
   (ii) alumino-hydroxo-complexes of the summation formula $M_xAl(OH)_y$, with x ranging from 1 to 3 and y ranging from 4 to 6, and with M representing Na or K, and
   (iii) aluminum phosphates, said microcapillary composite matrix having a surface and a specific electric resistance of less than 25 ohm.cm, measured on said surface of said composite matrix.

2. A composite matrix as set forth in claim 1, wherein the ratio c/b ranges from 5 to 20 and the ratio a/b ranges from 5 to 15.

3. A composite matrix as set forth in claim 1, wherein said aluminum phosphates comprise condensed aluminum phosphates.

4. A composite matrix as set forth in claim 1, wherein said coating material further comprises alkali silicates and water-dispersible organic polymers.

5. A composite matrix as set forth in claim 4, wherein said alkali silicate of said coating material corresponds to the summation formula $a(M_2O)*b(SiO_2)*c(H_2O)$, with a ratio b/a ranging from 0.5 to 3.0 and c ranging from 0 to 10.

6. A composite matrix as set forth in claim 4, wherein said water-dispersible polymers of said coating material are selected from the group consisting of epoxy resin, phenol resin, polyether-polyimide, polyether, polyketone, polyimide-polyether, polysulfon, siloxane and silicone, olefine-homo- and copolymers, polystyrene, polycarbonate, polyester, polyurethane, polyacrylic resin, butadiene-styrene copolymer, and chlorinated polymers.

7. A composite matrix as set forth in claim 6, wherein said chlorinated polymers of said coating material are selected from the group consisting of polyvinyl chloride and chloroprene.

8. A composite matrix as set forth in claim 6, wherein said water-dispersible polymers are selected from the group consisting of styrene-butadiene copolymers, carboxylated styrene-butadiene copolymers and styrene-acrylic resin copolymers.

9. A composite matrix as set forth in claim 1, wherein said specific electric resistance on said surface of said microcapillary matrix is less than 5 ohm.cm.

10. A composite matrix as set forth in claim 1, wherein said alumino-silicate of said coating material is the product of mixing at least one of water-soluble alkali silicate, Kieselsol, microsilica and reactive alumino-silicate with at least one water-dissolved alumino-hydroxo-complex $M_xAl(OH)_y$ in which x ranges from 1 to 3 and y ranges from 4 to 6, and M represents Na or K.

11. A composite matrix as set forth in claim 10, wherein said reactive alumino-silicate is metakaolin.

12. A composite matrix as set forth in claim wherein said alumino-hydroxo-complex of said coating material is prepared by dissolving an aluminum compound selected from the group consisting of aluminum hydroxide, sodium aluminate and potassium aluminate in at least one of an aqueous soda lye and potash lye, at a total ratio of $MOH/Al_2O_3$ greater than 2.0, and with M representing Na or K.

13. A composite matrix as set forth in claim 12, wherein said alumino-hydroxo-complex of said painting or coating material is formed by admixing at least one organic aluminum-complexing compound.

14. A composite matrix as set forth in claim 13, wherein said at least one organic aluminum-complexing compound is tartaric acid.

15. A composite matrix as set forth in claim 1, wherein said coating material contains from 1 to 25% by weight of alkali silicates and from 0.5 to 10% by weight of aluminum phosphate.

16. A composite matrix as set forth in claim 15, wherein said painting or coating material further comprises metal phosphates.

17. A composite matrix as set forth in claim 16, wherein said metal phosphates are at least one of alkali orthophosphates and pyrophosphates.

18. A composite matrix as set forth in claim 1, wherein said coating material further comprises at least one of dispersing agents, thickening agents, water retention agents, film formers, fillers, additives and fiber materials.

19. A composite matrix as set forth in claim 1, further comprising at least one electrically conductive pigment admixed with said coating material in an amount of from 30 to 80% by volume, based on said coating material in its air-dried state.

20. A composite matrix as set forth in claim 19, wherein said at least one electrically conductive pigment is selected from the group consisting of carbon, graphite, carbon black, acetylene black, nickel noble metals, noble-metal-coated metals, molybdenum disilicide, $TiO_x$ (with x less than 2.0), and $SnO_2$.

21. A composite matrix as set forth in claim 19, wherein said at least one electrically conductive pigment is graphite.

22. A composite matrix as set forth in claim 19, wherein said at least one electrically conductive pigment is admixed to said coating material in an amount of from 40 to 60% by volume, based on said coating material in its air-dried state.

23. A composite matrix as set forth in claim 19, wherein said electrically conductive pigment admixed with said coating material is a metal-coated non-metal.

24. A composite matrix as set forth in claim 1, further comprising at least one electrically conductive fiber material admixed to said coating material in an amount of from 1 to 30% by volume, based on said coating material in its air-dried state.

25. A composite matrix as set forth in claim 24, wherein said at least one electrically conductive fiber material is selected from the group consisting of carbon fibers, pyrolized PAN fibers and graphite fibers.

26. A composite matrix as set forth in claim 24, wherein said at least one electrically conductive fiber material is admixed to said coating material in an amount of from 5 to 20% by volume, based on said coating material in its air-dried state.

27. A composite matrix as set forth in claim 24, wherein said electrically conductive fiber material admixed with said coating material is a metal-coated non-metal.

28. A method for producing a microcapillary composite matrix contained in the surface layer of aporous mineral material for increasing the durability of porous mineral materials, comprising applying an alumino-silicate-based coating to a porous mineral substructure, said coating having admixed thereto at least one compound selected from the group consisting of (i) alumino-silicates of the summation formula $aM_2O*bAl_2O_3*cSiO_2$, with a ratio c/b ranging from 1 to 40, and a ratio a/b ranging from 1 to 25, and with M representing Li, Na or K, (ii) alumino-hydroxo-complexes of the summation formula $M_xAl(OH)_y$, with x ranging from 1 to 3 and y ranging from 4 to 6, and with M representing Na or K, and (iii) aluminum phosphates, said microcapillary composite matrix having a surface and a specific electric resistance of less than 25 ohm.cm, measured on said surface of said composite matrix.

29. A method for producing an electrically conductive microcapillary composite matrix, said composite matrix being formed in a surface layer of mortar or concrete comprising applying an electrically conductive coating material on said mortar or concrete, said coating material having admixed thereto at least one compound selected from the group consisting of (i) alumino-silicates of the summation formula $aM_2O*bAl_2O_3*cSiO_2$, with a ratio c/b ranging from 1 to 40, and a ratio a/b ranging from 1 to 25, and with M representing Li, Na or K, (ii) alumino-hydroxo-complexes of the summation formula $M_xAl(OH)_y$, with x ranging from 1 to 3 and y ranging from 4 to 6, and with M representing Na or K, and (iii) aluminum phosphates, said microcapillary composite matrix having a surface and a specific electric resistance of less than 25 ohm.cm, measured on said surface of said composite matrix, and applying an electrically conducting paint or an electrically conducting coating to said microcapillary composite matrix.

30. A method as set forth in claim 29, wherein said electrically conducting paint or said electrically conducting coating comprises at least one of electrically conductive pigments and electrically conductive fiber materials, with said electrically conductive pigments being admixed to said coating in an amount of from 30 to 80% by volume, based on said coating in its air-dried state, and said electrically conductive fiber material being admixed to said coating in an amount of from 1 to 30% by volume, based on said coating in its air-dried state.

* * * * *